(12) United States Patent
Akimoto et al.

(10) Patent No.: US 6,342,460 B1
(45) Date of Patent: Jan. 29, 2002

(54) INFRARED ABSORBING GLASS, AND IT'S FABRICATION METHOD

(75) Inventors: Yoshinobu Akimoto; Hiroaki Kinoshita, both of Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/336,678

(22) Filed: Jun. 21, 1999

(30) Foreign Application Priority Data

| Jun. 22, 1998 | (JP) | 10-174897 |
| Jul. 10, 1998 | (JP) | 10-195480 |
| Mar. 4, 1999 | (JP) | 11-057195 |
| Jun. 3, 1999 | (JP) | 11-156617 |

(51) Int. Cl.[7] ............................................. C03C 3/04
(52) U.S. Cl. ........................... 501/55; 501/54; 501/73; 501/905
(58) Field of Search ................... 501/12, 54, 55, 501/73, 905

(56) References Cited

U.S. PATENT DOCUMENTS

| 2,693,422 A | * | 11/1954 | Duncan et al. | 501/905 |
| 3,146,120 A | * | 8/1964 | Upton et al. | 501/905 |
| 3,445,252 A | * | 5/1969 | MacDowell | |
| 3,639,113 A | * | 2/1972 | Aslanova et al. | |
| 3,650,781 A | * | 3/1972 | Baak | 501/59 |
| 3,779,781 A | * | 12/1973 | Baak et al. | 501/54 |
| 4,002,482 A | * | 1/1977 | Coenen | 501/33 |
| 4,788,165 A | * | 11/1988 | Fong et al. | 501/66 |
| 5,206,189 A | * | 4/1993 | Caldwell | 501/12 |
| 5,254,148 A | * | 10/1993 | Inami et al. | 501/12 |

FOREIGN PATENT DOCUMENTS

| JP | 62-128943 | | 6/1987 |
| JP | 4-214043 | | 8/1992 |
| RU | 2087436 | * | 8/1997 |

* cited by examiner

*Primary Examiner*—David R Sample
(74) *Attorney, Agent, or Firm*—Pillsbury Winthrop LLP

(57) ABSTRACT

The invention relates to a glass excellent in infrared absorption capability and corrosion resistance, and its fabrication process. A compound of divalent copper and a compound of a metal species for a network modifier oxide are introduced in a wet gel. Then, the wet gel is dipped in a dipping solution having a low solubility with respect to the compound of divalent copper and the compound of a metal species for a network modifier oxide for the precipitation in the wet gel of the divalent-t copper compound and the compound of a metal species for a network modifier oxide, followed by drying and firing. Thus, an infrared absorbing glass comprising 70 to 98 mol % of $SiO_2$, 1 to 12 mol % of CuO and 1 to 18 mol % of a network modifier oxide other than CuO is fabricated.

5 Claims, 5 Drawing Sheets

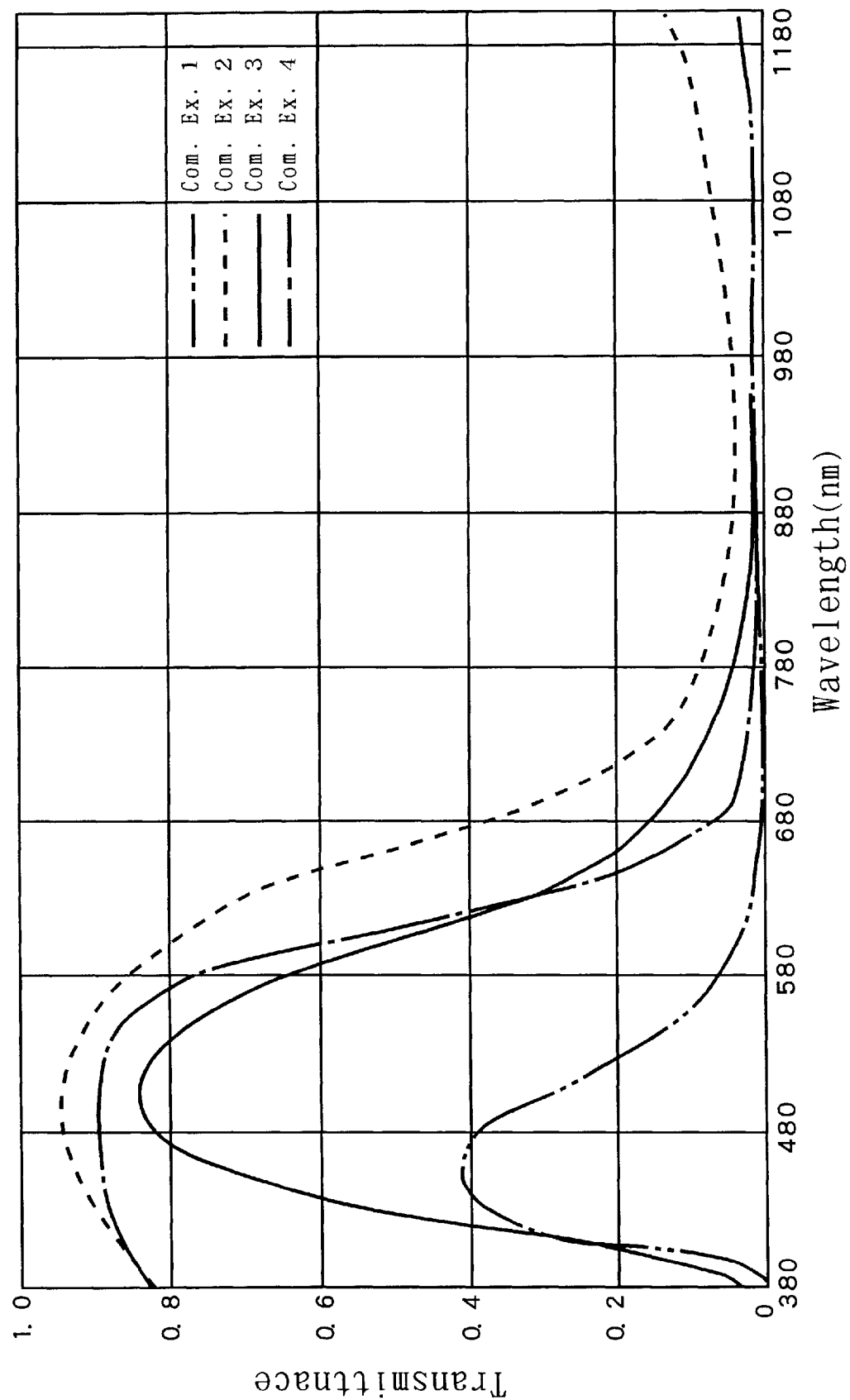

INFRARED ABSORBING GLASS, AND IT'S FABRICATION METHOD

BACKGROUND OF THE INVENTION

The present invention relates to an infrared absorbing glass used for electronic image pickup elements, etc., and its fabrication process.

In general, an infrared absorbing filter for cutting light in the infrared range is used with an electronic image pickup element such as a CCD image sensor so as to make correction for relative visibility. This infrared absorbing filer is also used with a medical endoscope so as to prevent laser light from being guided from YAG laser (of around 1,060 nm) and semiconductor laser (of 800 to 900 nm) to the electronic image element.

For instance, when the intensity of YAG laser is high, an interference film comprising several to several tens of laminated layers, each comprising a low refractive index layer such as a silica layer and a high refractive index layer such as a titania layer, is provided on the infrared absorbing filter to cut a substantial portion of YAG laser by interference and cut the remaining laser component by the infrared absorbing filter.

Such an infrared absorbing glass is required to be capable of effectively cut light in the infrared range, e.g., light of 700 nm or higher such as the aforesaid laser and, at the same time, show a suitable spectral distribution in a visible light region of 380 to 700 nm. More illustratively, the infrared absorbing glass has a spectral transmittance of up to 5% at 800 nm near the wavelength used with solid laser, up to 5% at 1,100 nm near the wavelength used with YAG laser, about up to 8% at around 700 nm or a red wavelength relating greatly to the color reproduction of images, at least 60% at around 500 nm relating to brightness, and at least 40% at around 380 nm relating to color reproduction and brightness. In particular, the infrared absorbing glass should preferably have a spectral transmittance of at least 60% at around 380 nm.

In recent years, a thin filter is needed in view of the size reduction of an optical system. The filter thickness is determined depending on the capability of absorbing infrared rays per unit thickness, and so glasses having high infrared absorption capability per unit thickness are needed. The capability of absorbing infrared rays per unit thickness is determined depending on the concentration of an infrared absorbing component, and so it is possible to achieve a thin filter by obtaining a glass containing such a component at a high concentration. For instance, divalent copper ions are most suitable for the infrared absorbing component, and so a glass containing much CuO is needed.

However, the larger the content of copper, the lower the transmittance at around 400 nm becomes low. This in turn offers two problems, i.e., low light due to a decrease in the quantity of light in a visible region, and a decrease in the quantity of light in a short wavelength region where CCD sensitivity is low. Two such problem cause the S/N ratio to become worse at a short wavelength, and color reproducibility to become worse due to a decrease in the amount of information.

Glasses for infrared cut filters are generally fabricated by a melting method wherein the starting materials are melted at high temperatures. When silica glass is doped with copper by means of the melting method, however, it is required to melt the silica glass at a high temperature of about 1,500° C. The higher the temperature, the stronger the reducibility of the atmosphere is, and so copper ions change from divalence to stable monovalence in the reducing atmosphere, resulting in a spectral characteristic change.

This in turn causes the infrared absorption capability and visible light transmittance to decrease. In addition, copper is susceptible to coherence and crystallization in the silica glass, and so it is substantially impossible to elevate the concentration of copper. It is thus very difficult to fabricate the desired glass.

The situation being like this, phosphate glass doped with copper is now often used for infrared absorbing filters. However, a problem with the phosphate glass is that its chemical resistance is low. As disclosed in JP-A's 62-128943 and 4-214043, it is proposed to dope the phosphate glass with aluminum, fluorine, etc., thereby improving their resistance. However, even such doped phosphate glass is still insufficient in applications such as endoscopes where it is required to have high resistance with respect to autoclaves, and washing with acids and alkalis. When an infrared absorbing glass in the form of an infrared cut filter is built in a product, it is often polished into a double-plane glass plate of about 0.1 mm to about 2 mm. The degree of abrasion of glass material is considered as being an index to processability upon glass processing and polishing. A glass material having a degree of abrasion of 200 or greater becomes soft, and cannot be processed due to poor processability. This glass material, if it can somehow be processed, requires some awkward steps. Phosphate glasses, and fluorophosphate glasses have generally large degrees of abrasion, with some glass having a degree of abrasion reaching as high as 400. Thus, these glasses are inferior in processability to, and more sensitive to damage than, ordinary optical glasses having a degree of abrasion of about 50 to 200, offering a problem such as difficulty in thickness control.

When an interference film for cutting YAG laser light, etc. is provided on phosphate or fluorophosphate glass, some problems arise. For instance, stresses occur due to a difference in thermal expansion between both materials because the silica base substance of the interference film component has a coefficient of thermal expansion of the order of $10^{-7}$ to $10^{-6}$ whereas the coefficient of thermal expansion of the phosphate or fluorophosphate glass is of the order of $10^{-5}$ or one order of magnitude greater. When the glass contains much phosphoric acid component, the interference film delaminates due to the absorption of atmospheric moisture.

In view of such problems with the prior art as mentioned above, an object of the invention is to provide an infrared absorbing silica glass which has infrared absorption capability equivalent to or greater than that of a prior art phosphate base infrared absorbing filter and, at the same time, high visible light transmittance as well as excellent chemical resistible and processability that the phosphate base infrared absorbing filter has not, and its fabrication process.

BRIEF DESCRIPTION OF THE DRAWINGS

FIG. 5 is a graph with the spectral transmittances of Comparative Examples 1 to 4 plotted.

SUMMARY OF THE INVENTION

Figure 1:
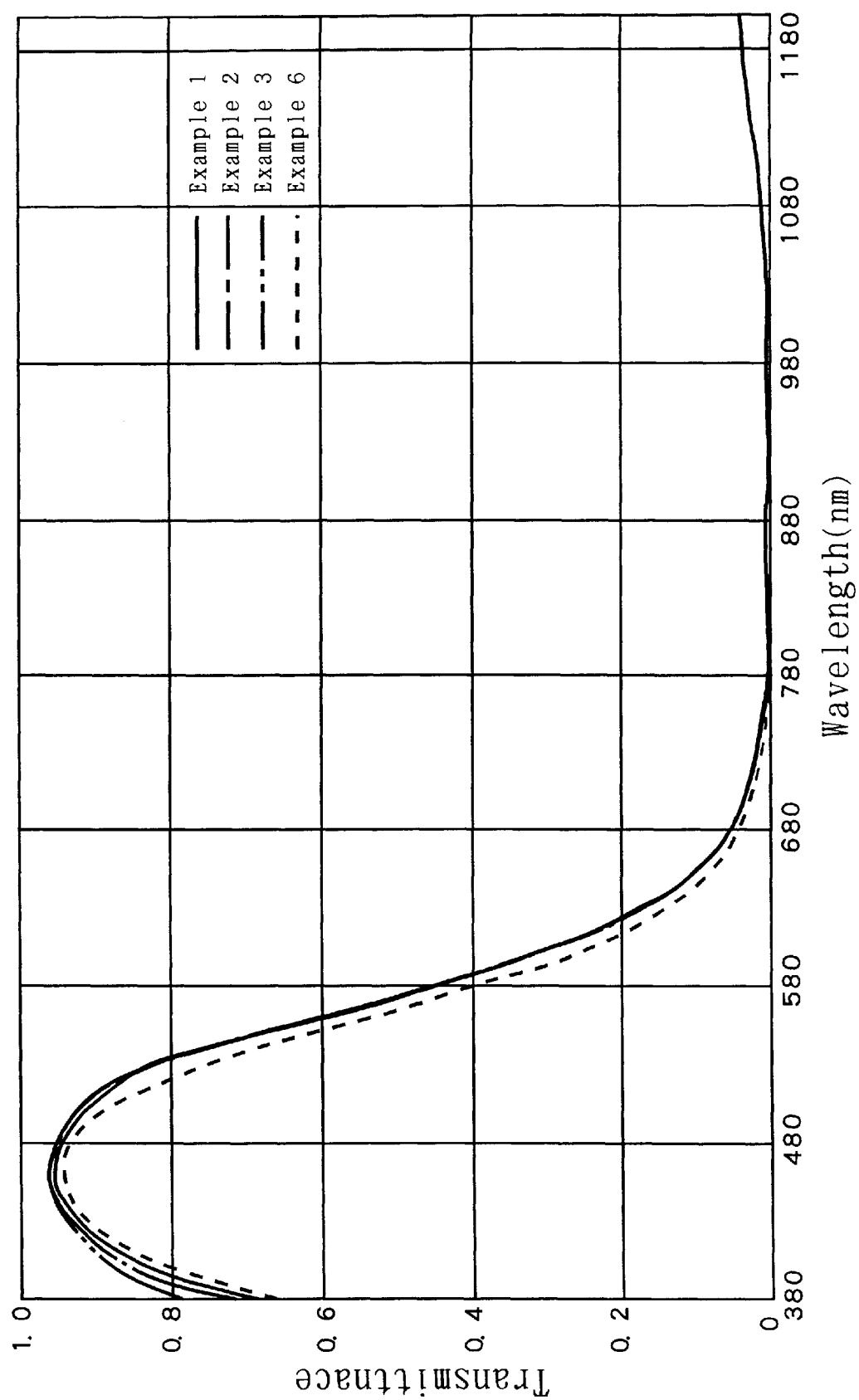
FIG. 1 is a graph with the spectral transmittances of Examples 1, 2, 3 and 6 plotted.

According to one aspect of the invention, there is provided an infrared absorbing glass comprising 70 to 98 mol % of $SiO_2$, 1 to 12 mol % of CuO, and 1 to 18 mol % of a network modifier oxide other than CuO.

According to another aspect of the invention, there is provided an infrared absorbing glass comprising 78 to 94 mol % of $SiO_2$, 3 to 8 mol % of CuO, and 3 to 14 mol % of a network modifier oxide other than Cuo.

Preferably, the molar ratio of the network modifier oxide with respect to CuO should be at least 1.0 on an oxide basis.

Preferably, the network modifier oxide should comprise an oxide of at least one metal selected from the group consisting of Li, Na, K, Rb, and Cs.

According to yet another aspect of the invention, there is provided a process of fabricating an infrared absorbing glass by introducing into a wet gel a divalent copper compound and a compound of a metal species for a network modifier oxide, and then dipping the wet gel in a dipping solution having a low solubility with respect to the divalent copper compound and the compound of a metal species for a network modifier oxide for the precipitation in the wet gel of the divalent copper compound and the compound of a metal species for a network modifier oxide, followed by firing, and drying. This process is especially suitable for glass fabrication recited in claims 1 to 4.

According to a further aspect of the invention, there is provided an infrared absorbing silica glass which shows a transmittance of up to 8% at 700 nm, up to 5% at 1,100 nm, and at least 70% at 500 nm upon formed into a double-plane glass plate having a thickness of 1.6 mm to 0.1 mm.

Preferably, the infrared absorbing silica glass should have a transmittance of at least 60% at 380 nm.

Preferably, the infrared absorbing silica glass should have a degree of abrasion of up to 200.

Preferably, the infrared absorbing silica glass should have a coefficient of thermal expansion of up to $9 \times 10^{-6}$.

DESCRIPTION OF THE PREFERRED EMBODIMENTS

The present invention provides a glass having a composition comprising a dopant as divalent copper oxide having absorption at about 800 nm and infrared cut capability, a silica skeleton and a vitrification-aiding network modifier oxide and so suitable for vitrification. Thus, the glass of the invention can have excellent infrared absorption capability and, at the same time, high visible light transmittance as well as chemical endurance and processability.

The infrared absorbing glass of the invention has everhigher chemical resistance than fluorophosphate glass or glass comprising a phosphate skeleton, because the glass of the invention comprising as a glass skeleton silica having a tetrahedral structure that is more chemically stable than such glasses. In addition, the glass of the invention, because of being a silicate glass, has a coefficient of thermal expansion that is of the order of $10^{-6}$ or close to that of a material used for interference films, e.g., silica, and titania, so that even after an interference film is formed thereon, problems such as film delamination are less likely to arise. The resistance and thermal expansion properties become worse as the glass skeleton-forming SiO2 component decreases. If, as defined herein, $SiO_2$ is in the range of 70 to 98 mol %, CuO is in the range of 1 to 12 mol % and the network modifier oxide other than CuO is in the range of 1 to 18 mol %, however, satisfactory properties can then be well maintained.

It is here noted that the infrared absorbing glass of the invention is governed by the concentration of copper and its electron state. When the concentration of CuO is less than 1 mol %, the thickness of the obtained glass sample becomes large because the infrared absorption capability per unit thickness decreases. When the concentration of CuO is greater than 12 mol %, a part of Cu is often crystallized, leading to a failure in obtaining homogeneous glass in high yields, or resulting in glass having a generally decreased visible light transmittance.

The network modifier oxide other than CuO is used to achieve two effects, one on making a vitrification region wide and another on obtaining the desired spectral transmittance. A metal species having a low electronegativity and a large atomic radius, i.e., a metal species causing easy scission of the silica skeleton and susceptible to vitrification is used for the network modifier oxide. Exemplary network modifier oxides are alkali metals such as Li, Na, K, Rb, and Cs, and alkaline earth metals such as Be, Mg, Ca, Ba, and Sr.

Industrially useful glass compositions, from which infrared absorbing glasses having especially excellent infrared absorption capability and, at the same time, high visibile light transmittance and chemical resistance can be fabricated in high yields, should preferably comprise 78 to 94 mol % of $SiO_2$, 3 to 8 mol % of CuO and 3 to 14 mol % of the network modifier oxide other than CuO.

Thus, the larger the amount of the network modifier oxide, the more unlikely is copper to cohere, and so the more effectively the decrease of transmittance at around 400 nm can be prevented. In other words, an infrared absorbing glass that is bright and has high infrared absorption capabilities per unit thickness can be obtained by the incorporation of a large amount of copper ions.

From a standpoint of resistance, on the other hand, the silicate glass of the invention is sufficiently high in terms of chemical resistance as compared with phosphate or fluorophosphate glasses. However, the larger the amount of copper or the network modifier oxide, the more susceptible is the silica skeleton to scission, and so the lower the chemical resistance is. Thus, a composition comprising suitable copper and a suitable network modifier oxide is important for an infrared absorbing silica glass having the desired infrared absorption capability and, at the same time, high visible light transmittance as well as chemical resistance. According to the invention, such an infrared absorbing glass is achievable by a composition comprising 78 to 94 mol % of $SiO_2$, 3 to 8 mol % of CuO, and 3 to 14 mol % of the network modifier oxide other than CuO.

To achieve the infrared absorption capability that cannot be obtained with prior art fluorophosphate glasses, the glass of the invention should contain Cu at a concentration of 3 mol % to 8 mol % inclusive where almost 100% yields are obtainable. At a Cu concentration of greater than 8 mol %, the glass is susceptible to gradual crystallization, and at a Cu concentrartion of 12 mol %, the yields decrease to about 60%. Thus, an infrared absorbing glass having high infrared absorption capabilities per unit thickness can be fabricated very stably in the above concentration range.

With the glass composition of the invention wherein the molar ratio of the network modifier oxide with respect to CuO is at least 1.0, and preferably at least 1.3 on an oxide basis, it is possible to keep high transmittance at around 400 nm probably for the following reasons.

Although the network modifier oxide cleaves the silica structure, the electron state of oxygen changes to a negatively charged state depending on the electronegativity of the metal species of the network modifier oxide, thereby promoting coordination to $Cu^{2+}$ and so interaction with $Cu^{2+}$. Even when the content of copper increases, therefore, the copper ions can maintain divalent absorption characteristics. When the molar ratio of the oxide with respect to CuO is less than 1.0, bond scission takes place, and so the number of oxygen atoms with negative charges decreases with respect to the copper ions. Accordingly, some copper ions change to monovalent ions, not divalent ions, or to a cluster containing monovalent ions, so that they can be shifted to the absorption wavelength for divalent copper ions, say, 360 nm to 430 nm. As a result, green glass is obtained due to a decrease of transmittance in the blue region. When the molar ratio of the network modifier oxide with respect to CuO is greater than 1.0, on the other hand, the number of oxygen atoms with negative charges increases, and so it is possible to make the transmittance at around 400 nm high. In particular, the greater than 3 mol % the concentration of Cu, the lower the transmittance at around 400 nm is. As the molar ratio of the network modifier oxide with respect to CuO increases from 1.0 to 1.3, the transmittance tends to increase. At a molar ratio exceeding 3, however, the transmittance increase is not very high. In addition, the larger the oxide ratio, the higher the proportion of the network modifier oxide is, and so the chemical resistance becomes worse. It is thus required to place transmittance and resistance in a well-balanced state. The most preferred ratio is in the range of 1.3 to 3. For such a network modifier component, it is preferable to use alkali metals, and alkaline earth metals.

Li, Na, K, Rb and Cs that are alkali metals are mentioned for the metal species of the network modifier oxide most preferred for the glass of the invention. The alkali metal is preferred because it is capable of making the range of vitrification wide, and is greatly effective to maintain copper in a divalent state, thereby obtaining the desired spectral transmittance. The alkali metal is characterized by having a smaller electronegativity value and a larger atomic radius as compared with other metal. For this reason, it appears that the alkali metal facilitates scission of the silica skeleton, and copper ions interact easily with cleaved oxygen so that the shift of copper absorption wavelength is unlikely to occur.

Among the alkali metals, Na and K are most preferred because they are easy to handle and commercially available on an industrial scale.

On the other hand, when the glass of the invention is used as a cyan filter colored in blue, not as an infrared absorbing cut filter used with an image pickup element using a CCD, it may be used while such color changes are controlled.

In addition to the alkali metal and alkaline earth metal, the network modifier oxide used herein may contain other elements such as Al, Zr, Nb, and La as long as they are not detrimental to the effects of the invention such as spectral characteristics and resistance.

The infrared absorbing glass of the invention may be fabricated by a so-called sol-gel method wherein low-temperature synthesis is feasible. According to the sol-gel method, a sol obtained from a metal alkoxide and a metal salt is gelled into a wet gel, and the wet gel is then dried and fired for dehydration and polycondensation, thereby making glass. With the sol-gel method, it is possible to make glass at a temperature at least 500° C. lower than the melting method carried out at a temperature of 650 to 750° C. that is substantially close to a glass transition point, although the heat-treatment temperature varies depending on glass composition. Thus, the sol-gel method is suitable for the fabrication of the aforesaid infrared absorbing glass because the heat treatment can be carried out in a low temperature region where copper ions can be present in a divalent form suitable for infrared absorbing glass in a stable manner.

The process of the invention will now be explained with reference to one embodiment.

(1) Sol Preparation

An alcohol such as ethanol, water, hydrochloric acid, acetic acid, etc. are added to a silicon alkoxide such as tetramethyl orthosilicate, and tetraethyl orthosilicate for promoting hydrolysis and polycondensation, thereby preparing a sol.

(2) Gelation

The prepared sol are poured by portions into a vessel of high releasability such as one formed of polypropylene or the like. Then, the vessel with a lid put thereon is allowed to stand alone in a thermostat or the like, thereby preparing a wet gel.

(3) Introduction of Copper and Network Modifier Component

A doping solution is prepared by dissolving a given concentration of an organic salt such as copper acetate, and potassium acetate, an inorganic salt such as copper hydrochloride, and potassium nitrate, a hydroxide such as copper hydroxide, sodium hydroxide or the like in water, an acid or the like. The wet gel is dipped in the doping solution, whereby copper or potassium in the form of metal ions obtained by dissolution of the metal salt is diffused into pores in the wet gel. Thus, copper or the alkali metal can be introduced uniformly into the wet gel.

For the metal salt used for doping solution preparation, it is preferable to use an organic acid salt because the next step for precipitation of crystallites of the metal salt can be carried out in a stable manner. Acetates as well as salts of organic acids such as citric acid and malic acid are especially preferred, although inorganic salts such as nitrates and hydrochlorides may be used in the invention.

(4) Precipitation of Metal Salt Crystallites

The above salt-containing wet gel is dipped in a dipping solution of acetone or the -Like having a low solubility to the metal salt. As the dipping solution diffuses into the wet gel, the solubility becomes low so that the metal salt in a crystallite form can be precipitated in gel pores.

If required, the wet gel is dipped several times in the dipping solution having a low solubility to the metal salt. In this case, it is acceptable to vary the composition, etc. of the dipping solution for each dipping. Thus, the solvent having a high solubility to the metal salt, e.g., water is removed from the wet gel. The dipping operation should preferably be carried out for a few minutes to a few days depending on gel size, the type and amount of the solvent remaining in the gel, etc.

(5) Drying

The wet gel with the crystallites of copper and the alkali metal compound precipitated uniformly therein is dried to remove therefrom the solution of water and acetone or the like having a low solubility to the metal salt. Drying should preferably be carried out at a temperature ranging from room temperature to about 200° C. For instance, the temperature of a 50° C. thermostat may be slowly elevated or the wet gel may be transferred from a 50° C. thermostat to a 150° C. thermostat. Drying should preferably be carried out for a few days although depending on gel size. It is also acceptable to dry the wet gel in a supercritical atmosphere created by use of an autoclave or the like.

(6) Firing

The dried gel is heated to a temperature of 650 to 750° C. to deprive it of pores. The heat-treatment temperature may determined as desired, depending on glass compositions, etc. After the heat treatment, the gel is cooled down to room temperature to obtain a columnar infrared absorbing silica glass comprising $SiO_2$, $K_2O$ and CuO.

The heat-treatment time may be determined depending on glass compositions; generally, the heat treatment may be carried out for a long time at low temperature, and for a short time at high temperature.

During the heat treatment, care should be taken to prevent any glass composition change due to the heat treatment. In, for instance, an atmosphere containing a reduced amount of oxygen, CuO is readily reduced with a decrease of divalent copper ions, resulting in an absorption band change and so making it impossible to obtain glass having the desired transmittance characteristics. It is thus required to heat-treat the dry gel in an atmosphere containing a sufficient amount of oxygen. When glass is deprived of pores by heating, the water contained therein may cause bubbles if it is not removed. To deprive the glass of pores, the glass should preferably be heat-treated in a helium atmosphere.

The above-mentioned sol-gel method enables vitrification to take place at a low temperature where the melting method cannot be carried out. With this sol-gel method, the copper component in a divalent form having absorption at about 800 nm is allowed to be present in glass, so that an infrared absorbing filter having a great infrared absorption effect can be obtained. More illustratively, it is possible to obtain a double-plane glass plate having a thickness of 1.6 mm to 0.1 mm, which can be formed into an infrared absorbing glass filter having a transmittance of up to 8% with respect to 700-nm wavelength light, up to 5% with respect to 1,100-nm wavelength light, and at least 70% with respect to 500-nm wavelength light. It is also possible to obtain an infrared absorbing glass having an absorptivity of at least 60% with respect to 380-nm wavelength light, which can be formed into a filter having a high transmittance at short wavelengths. Further, it is possible to obtain an infrared absorbing glass having a degree of abrasion of up to 200, which can be formed into a filter having high resistance. Furthermore, it is possible to obtain an infrared absorbing glass having a coefficient of thermal expansion of up to $9 \times 10_{-6}$. This glass can be formed into a filter which, upon an interference film or the like laminated thereon, is less susceptible to delamination, etc.

The present invention will now be explained with reference to examples.

EXAMPLE 1

In each test run, 92 grams of ethanol and 38 grams of 1 N acetic acid were added to 42 grams of tetraethyl orthosilicate for hydrolysis, thereby preparing a sol. Four (4) ml of the sol was poured in a cylindrical polypropylene vessel of 10 mm in inner diameter, on which a stopper was then put. Subsequently, the vessel was held at 50° C. for 7 days to prepare a wet gel. On the other hand, a doping solution was prepared by dissolving 19 grams of copper acetate and 20 grams of potassium acetate in 500 grams of pure water. The wet gel was dipped in the doping solution for 24 hours to introduce the copper compound and alkali metal compound uniformly into the wet gel. Then, the wet gel was removed from the doping solution, and washed with 10 ml of acetone. Following this, the wet gel was dipped in 10 ml of acetone placed in another vessel for 24 hours. This acetone washing and acetone dipping operation was repeated three times for the precipitation in the wet gel of crystallites of the copper compound and alkali metal compound.

The wet gel was allowed to stand alone in a thermostat of 50° C. for 24 hours, and then transferred into a thermostat of 150° C. where it was allowed to stand alone to prepare a dry gel. The obtained dry gel was heated to 700° C. in an oxygen atmosphere, then held at 700° C. for 10 hours in a helium atmosphere, and finally cooled down to room temperature to prepare a columnar infrared absorbing silica glass made up of $SiO_2$, $K_2O$ and CuO. The thus obtained columnar infrared absorbing silica glass was cut into a piece, which was then mirror-polished parallel on both surfaces to make a sample.

Chief preparation conditions, and glass compositions are shown in Table 1. It is here noted that the glass compositions were analyzed by means of an energy dispersed X-ray spectrometer (EDX) (QX2000 made by LINK Co., Ltd.).

Examples 2–6

In Examples 2 to 6, glasses were prepared as in Example 1 with the exception that the composition of the doping solution and the preparation conditions were changed to those shown in Table 1.

TABLE 1

| | Copper Acetate (mol/l) | Potassium Acetate (mol/l) | Firing Temp. (° C.) |
|---|---|---|---|
| Ex. 1 | 0.2 | 0.4 | 700 |
| Ex. 2 | 0.1 | 0.2 | 710 |
| Ex. 3 | 0.05 | 0.1 | 700 |
| Ex. 4 | 0.2 | 0.3 | 710 |
| Ex. 5 | 0.2 | 0.5 | 690 |
| Ex. 6 | 0.3 | 0.5 | 680 |

| | Glass Composition (mol %) | | | | |
|---|---|---|---|---|---|
| | $SiO_2$ | CuO | $K_2O$ | CuO Ratio | Sample Thickness (mm) |
| Ex. 1 | 88 | 5 | 7 | 1.4 | 0.4 |
| Ex. 2 | 95 | 2 | 3 | 1.4 | 0.8 |
| Ex. 3 | 97.5 | 1 | 1.5 | 1.5 | 1.6 |
| Ex. 4 | 90 | 5 | 5 | 1.0 | 0.4 |
| Ex. 5 | 84 | 5 | 10 | 2.0 | 0.4 |
| Ex. 6 | 82 | 7 | 10 | 1.4 | 0.27 |

In Table 1, the CuO ratio is understood to refer to the molar ratio of the potassium oxide with respect to CuO.

The obtained samples were measured for spectral transmittance by means of a spectrometer (U-4000 made by Hitachi, Ltd.). The transmittance changes are plotted in FIGS. 1 and 2.

The transmittances of the samples according to Examples 1, 2, 3, and 6 are shown in FIG. 1. In Examples 1, 2, 3, and 6, even thin samples show substantially similar spectral curves when they have an increasing copper concentration. The transmittances of these samples at typical wavelengths were about 5% at around 700 nm or a wavelength used with solid laser, and about 1% at around 1,100 nm or a wavelength used with YAG laser. The samples also showed transmittances of about 5% at around 700 nm or a red wavelength relating greatly to the color reproduction of images, about 90% at 500 nm relating to brightness, and about 70% at around 380 nm relating to color reproduction and brightness.

Figure 2:
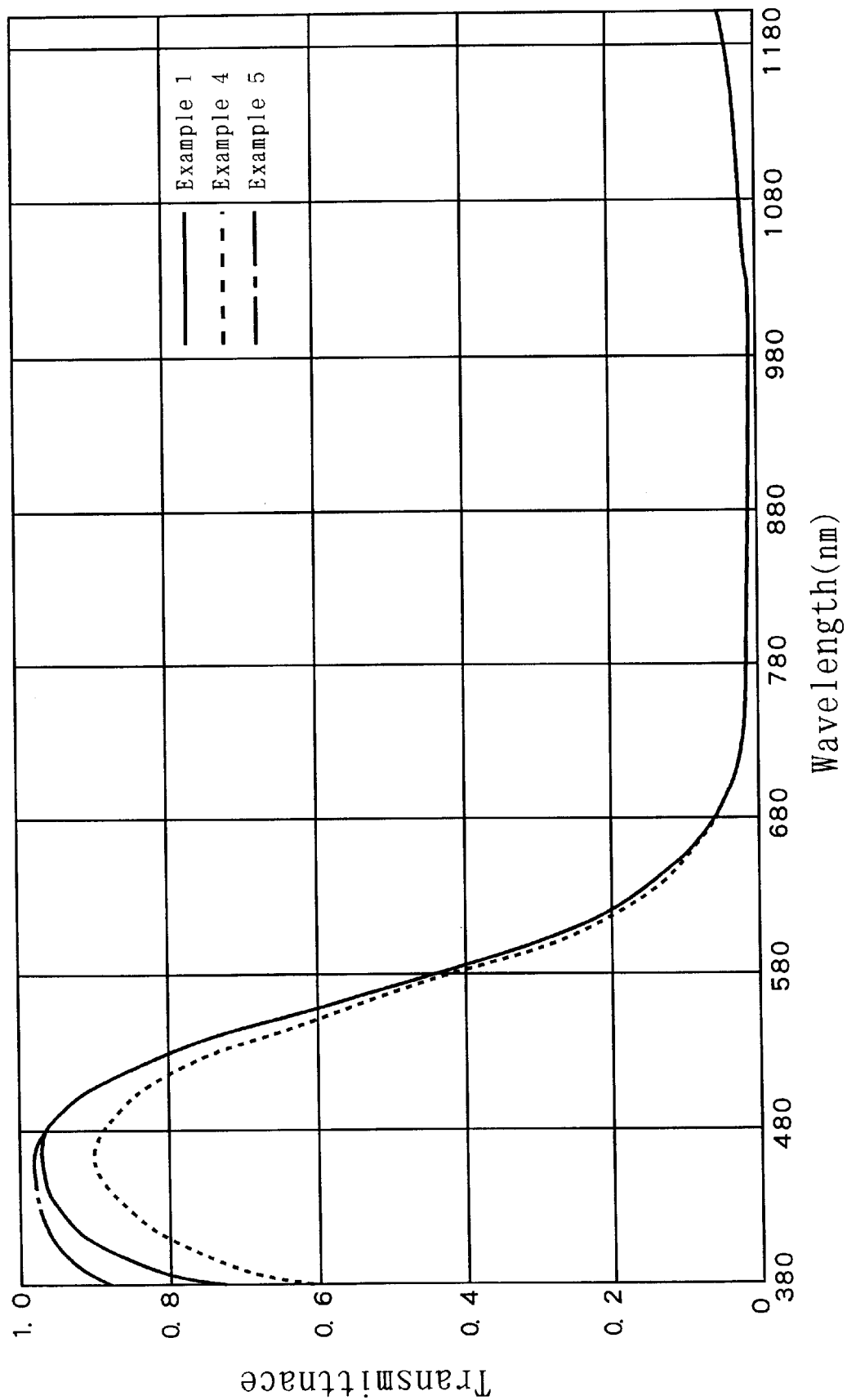
FIG. 2 is a graph with the spectral transmittances of Examples 1, 4 and 5 plotted.

The spectral transmittances of the samples according to Examples 1, 4, and 5 are shown in FIG. 2. From a comparison of the potassium and copper concentrations in the glass samples, it is found that the transmittance at around 380 nm is about 70% in Example 1, about 60% in Example 4, and about 85% in Example 5, respectively.

The glass plane plates obtained in these examples were provided thereon with antireflection coatings for use as infrared absorbing filters for CCDs. Satisfactory images could be obtained with all these glass samples. In particular, the filters prepared using the glass samples of Examples 1 and 5 were found to give more satisfactory images than do other filters even when dark subjects were phototaken. This appears to be primarily because high transmittance at around 380 nm as shown in FIG. 2 ensured sufficient grabbing of information in a blue wavelength region.

The glass samples were found to have a coefficient of thermal expansion of $6 \times 10^{-7}$ to $5 \times 10^{-6}$. Fifteen silica films and fifteen titania films were alternately laminated together to prepare an interference film, which was allowed to stand alone in a thermostat at a temperature of 65° C. and a humidity of 90% RH for 10 days. However, problems such as delamination were not observed at all.

A filter may vary in transmittance characteristics depending on its thickness. According to the invention, it is thus possible to vary the transmittance of each sample with respect to visible light by varying its thickness depending on the demanded infrared cutting capability.

EXAMPLE 7

Ninety-two (92) grams of ethanol and 38 grams of 1 N acetic acid were added to 31 grams of tetramethyl orthosilicate for hydrolysis, thereby preparing a sol. Four (4) ml of the sol was poured in a cylindrical polypropylene vessel of 10 mm in inner diameter, on which a stopper was then put. Subsequently, the vessel was held at 50° C. for 7 days to prepare a wet gel. On the other hand, a doping solution was prepared by dissolving 22 grams of copper hydroxide and 26 grams of potassium nitrate in a solution of 32 grams of lactic acid in 500 grams of pure water. The wet gel was dipped in the doping solution for 24 hours to introduce the copper compound and alkali metal compound uniformly into the wet gel.

Then, the wet gel was removed from the doping solution, and washed with 10 ml of acetone. Following this, the wet gel was dipped in 10 ml of acetone placed in another vessel for 24 hours. This acetone washing and acetone dipping operation was repeated three times for the precipitation in the wet gel of crystallites of the copper compound and alkali metal compound.

The wet gel was allowed to stand alone in a thermostat of 50° C. for 24 hours, and then transferred into a thermostat of 150° C. where it was allowed to stand alone to prepare a dry gel. The obtained dry gel was heated to the firing temperature shown in Table 2 in an oxygen atmosphere, then held at that temperature for 80 hours in a helium atmosphere, and finally cooled down to room temperature to prepare a columnar infrared absorbing silica glass made up of $SiO_2$, $K_2O$ and CuO. The thus obtained columnar infrared absorbing silica glass was cut into a piece, which was then mirror-polished parallel on both surfaces to make a sample.

As in Example 1, the obtained sample was subjected to EDX composition analysis, and measured for spectral transmittance.

EXAMPLES 8–9

A wet gel prepared as in Example 7 was immersed for 24 hours in a doping solution prepared with the concentration shown in Table 2 to introduce the copper compound and potassium nitrate uniformly in the wet gel. Then, the wet gel was removed from the doping solution, and washed with 10 ml of acetone. Following this, the wet gel was dipped in 10 ml of acetone placed in another vessel for 24 hours. This acetone washing and acetone dipping operation was repeated three times for the precipitation in the wet gel of crystallites of the metal salt.

The wet gel was allowed to stand alone in a thermostat of 50° C. for 24 hours, and then transferred into a thermostat of 150° C. where it was allowed to stand alone to prepare a dry gel. The obtained dry gel was heated to the firing temperature shown in Table 2 in an oxygen atmosphere, then held at that temperature for 80 hours in a helium atmosphere, and finally cooled down to room temperature to prepare a columnar infrared absorbing silica glass made up of $SiO_2$, $K_2O$ and CuO. The thus obtained columnar infrared absorbing silica glass was cut into a piece, which was then mirror-polished parallel on both surfaces to make a sample.

Chief preparation conditions, glass compositions, and sample thicknesses in Examples 7 to 9 are set out in Table 2. These samples were also measured for spectral transmittance.

Figure 3:
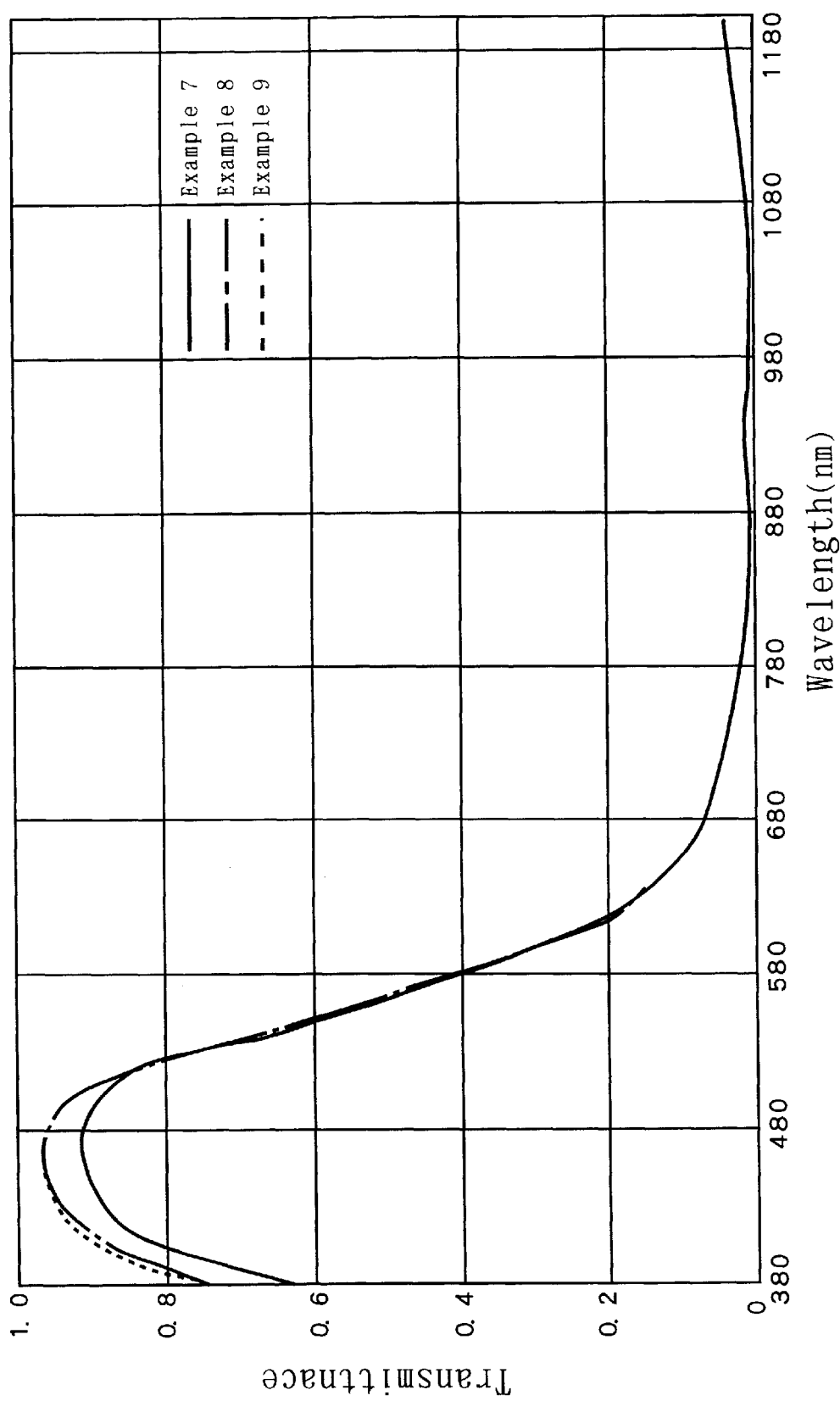
FIG. 3 is a graph with the spectral transmittances of Examples 7 to 9 plotted.

FIG. 3 shows the spectral transmittances in Examples 7 to 9. In Examples 8 and 9, spectral curves similar to that in Example 1 were obtained. In Example 7, the transmittance at around 380 nm was about 60% or slightly lower than that in Example 1.

The glass plane plates obtained in these examples were provided thereon with antireflection coatings for use as infrared absorbing filters for CCDs. Satisfactory images could be obtained with all these glass samples. In particular, the filters prepared using the glass samples of Examples 8 and 9 were found to give satisfactory images even when dark subjects were phototaken. This appears to be primarily because the high transmittance at around 380 nm as shown in FIG. 3 ensured sufficient grabbing of information in a blue wavelength region.

TABLE 2

| | Copper Hydroxide (mol/l) | Potassium Acetate (mol/l) | Firing Temperature (° C.) |
|---|---|---|---|
| Ex. 7 | 0.4 | 0.4 | 640 |
| Ex. 8 | 0.4 | 0.6 | 630 |
| Ex. 9 | 0.5 | 0.7 | 620 |

| | Glass Composition (mol %) | | | | |
|---|---|---|---|---|---|
| | $SiO_2$ | CuO | $K_2O$ | CuO Ratio | Sample Thickness (mm) |
| Ex. 7 | 78 | 10 | 12 | 1.2 | 0.2 |
| Ex. 8 | 75 | 10 | 15 | 1.5 | 0.2 |
| Ex. 9 | 70 | 12 | 18 | 1.5 | 0.18 |

In Table 2, the CuO ratio is understood to refer to the molar ratio of the potassium oxide with respect to CuO.

EXAMPLES 10–14

A wet gel prepared as in Example 1 was immersed for 24 hours in a doping solution prepared with the concentration shown in Table 3 to introduce the copper compound and acetic acid salt uniformly in the wet gel. Then, the wet gel was removed from the doping solution, and washed with 10 ml of acetone. Following this, the wet gel was dipped in 10 ml of acetone placed in another vessel for 24 hours. This acetone washing and acetone dipping operation was repeated three times for the precipitation in the wet gel of crystallites of the metal salt.

The wet gel was allowed to stand alone in a thermostat of 50° C. for 24 hours, and then transferred into a thermostat of 150° C. where it was allowed to stand alone to prepare a dry gel. The obtained dry gel was heated to the firing temperature shown in Table 3 in an oxygen atmosphere, then held at that temperature for 10 hours in a helium atmosphere, and finally cooled down to room temperature to prepare a columnar infrared absorbing silica glass made up of $SiO_2$, $K_2O$ and CuO. The thus obtained columnar infrared absorbing silica glass was cut into a piece, which was then mirror-polished parallel on both surfaces to make a sample.

Chief preparation conditions, glass compositions, and sample thicknesses in Examples 10 to 14 are set out in Table 3. These samples were also measured for spectral transmittance.

Figure 4:
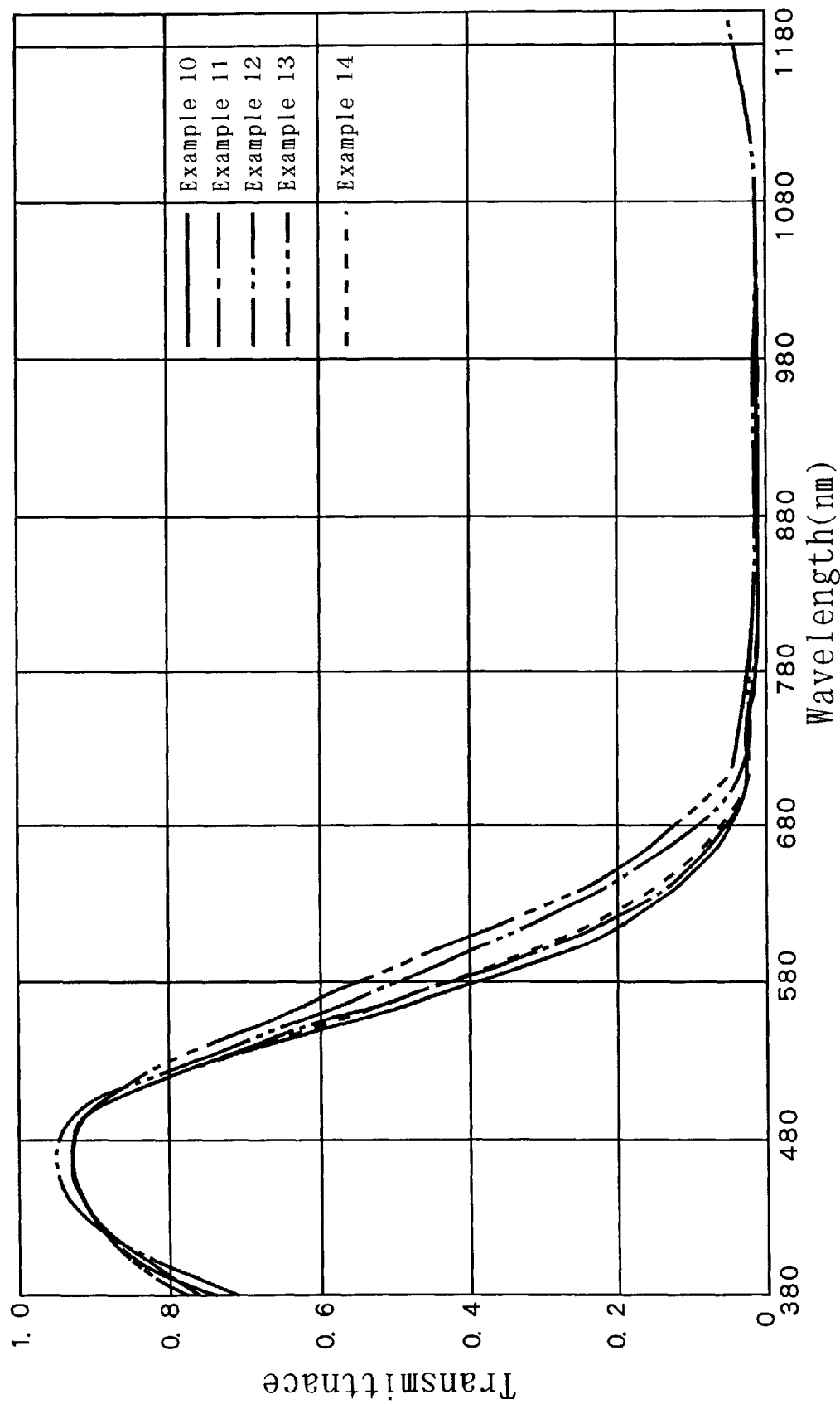
FIG. 4 is a graph with the spectral transmittances of Examples 10 to 14 plotted.

The spectral transmittances of the samples of Examples 10 to 14 are shown in FIG. 4. Spectral curves of similar shape were obtained. However, the spectral curves varied slightly depending on the type of the network modifier used. The transmittances in the red region decreased in the order of Examples 10, 11, 14, 12 and 13.

The glass plane plates prepared in these examples were provided with antireflection coatings for use as infrared absorbing filters for CCDs. As a result, satisfactory images could be obtained with all these glass filters.

TABLE 3

|  | Ex. 10 | Ex. 11 | Ex. 12 | Ex. 13 | Ex. 14 |
| --- | --- | --- | --- | --- | --- |
| Solution Concentration (mol/l) |  |  |  |  |  |
| Copper Acetate | 0.2 | 0.2 | 0.2 | 0.2 | 0.2 |
| Acetic Acid Salt 1 | lithium acetate | sodium acetate | cesium acetate | barium acetate | potassium acetate |
| Concentration | 0.4 | 0.4 | 0.4 | 0.2 | 0.2 |
| Acetic Acid Salt 2 | — | — | — | — | sodium acetate |
| Concentration | — | — | — | — | 0.2 |
| Firing Temp. (° C.) | 680 | 680 | 680 | 680 | 680 |
| Glass Composition (mol %) |  |  |  |  |  |
| $SiO_2$ | 88 | 88 | 88 | 88 | 88 |
| CuO | 5 | 5 | 5 | 5 | 5 |
| $K_2O$ | — | — | — | — | 3.5 |
| $Li_2O$ | 7 | — | — | — | — |
| $Na_2O$ | — | 7 | — | — | 3.5 |
| $Cs_2O$ | — | — | 7 | — | — |
| BaO | — | — | — | 7 | — |
| CuO Ratio | 1.4 | 1.4 | 1.4 | 1.4 | 1.4 |
| Sample Thickness (mm) | 0.4 | 0.4 | 0.4 | 0.4 | 0.4 |

In Table 3, the Cuo ratio is understood to refer to the molar ratio of the alkali metal oxide or alkaline metal oxide with respect to Cuo.

COMPARATIVE EXAMPLES 1–4

Comparative Examples are shown in Table 4. Comparative Examples 1 and 2 were carried out as in Example 1 under conditions specified in Table 4.

In Comparative Example 1, no homogeneous glass could be obtained because of growth of crystals of about 0.1 mm within the glass.

In Comparative Example 2, a homogeneous glass was obtained.

In Comparative Example 3, a glass was prepared by melting the starting materials at 1,500° C. by the melting method with the same composition ratio as in Example 1.

In Comparative Example 4, a commercially available fluorophosphate base infrared absorbing glass comprising barium, aluminum, etc. was used.

These glasses were polished flat to prepare samples.

TABLE 4

| Sample Solution Conc. (mol/l) | Comp. Ex 1 | Comp. Ex. 2 | Comp. Ex. 3 MM | Comp. Ex. 4 FPG |
| --- | --- | --- | --- | --- |
| Copper Acetate | 0.7 | 0.03 |  |  |
| Acetic Acid Salt 1 | potassium acetate | potassium acetate |  |  |
| Concentration | 0.7 | 0.4 |  |  |
| Firing Temp. (° C.) | 620 | 720 |  |  |
| Glass Comp. (mol %) |  |  |  |  |
| $SiO_2$ | 64 | 90 | 88 |  |
| CuO | 16 | 0.5 | 5 |  |
| $K_2O$ | 20 | 8 | 7 |  |
| CuO Ratio | 1.3 | 16 | 1.4 |  |
| Sample Thickness (mm) | 0.1 | 2.0 | 0.4 | 1.6 |

In Table 4, the Cuo ratio is understood to refer to the molar ratio of the alkali metal oxide with respect to CuO, and MM and FPG refer to the melting method and fluorophosphate glass, respectively.

The spectral transmittances of Comparative Examples 1 to 4 measured as in Example 1 are plotted in FIG. 5.

In Comparative Example 1, the proportion of copper in the glass was too high to cause partial crystallization of the glass. For this reason, the glass was susceptible to devitrification and composition variations, resulting in a decrease of visible light transmittance. In Comparative Example 2, the infrared absorption capability of the glass decreased because the proportion of copper in the glass was as low as 0.5 mol %. In Comparative Example 3, a part of copper was found to be present in a monovalent form because the starting materials were melted at as high as 1,500° C., resulting in a decrease in the visible light transmittance of the glass. The infrared absorption capability of the glass, too, decreased due to a decrease in the proportion of divalent copper.

In Comparative Example 4, the glass was found to have good visible light transmittance and be excellent in terms of the capability of absorbing near infrared rays (800 to 900 nm). However, the glass was incapable of absorbing YAG laser at around 1,060 nm.

Glass plane plates prepared in Comparative Examples 2, 3 and 4 were provided with antireflection coatings for use as infrared absorbing filbers for CCDs. In Comparative Example 4 good images were obtained but, in Comparative Examples 2 and 3, generally very reddish images were obtained. This is probably because light at wavelengths of 700 nm or higher could not be cut.

To estimate the degree of abrasion, the glasses obtained in the examples and comparative examples, and reference optical glasses having known degrees of abrasion, i.e., S-LAH 58 having a degree of abrasion of 60, S-BAL7 having a degree of abrasion of 95 and S-TIH53 (having a degree of abrasion of 165), all made by Ohara Co., Ltd., were formed into columns of 3 mm diameter and 3 mm in thickness. For this estimation, 150 plates were used for each glass.

Each sample was stuck onto a 60 mm square glass disk, and measured for abrasion wear per minute upon ground and polished with a #1500 grindstone under a grinding pressure of 5 Kg/cm². Values for the abrasion wear and degree of abrasion of the reference glasses were plotted on a line graph to roughly calculate the degreeof abrasion of the samples from the abrasion wear of the sample.

As a result, it was found that the degree of abrasion of the glass obtained in Example 1 is about 60 whereas the degree of abrasion of the fluorophosphate glass used in Comparative Example 4 is about 400. It is thus found that the inventive glass is superior in processability to the comparative glass.

For the estimation of resistance, ten samples for each glass were held in a thermostat at a temperature of 65° C. and a humidity of 90% RH for 22 hours and then at a temperature of 25° C. and a humidity of 50% RH for 2 hours. This cycle was repeated three times. By observation of the surfaces of the samples under a microscope of 100 magnifications, it was found that all the samples according to the examples remain substantially unchanged. However, 50 minute white spots of 0.01 to 0.05 mm were observed on the surface of the fluorophosphate glass in Comparative Example 4.

Thus, the glasses prepared in the inventive examples have excellent infrared absorption capability and, at the same time, excellent processability and resistance.

The glass of the invention is further characterized as mentioned below.

(1) An infrared absorbing silica glass which shows a transmittance of up to 8% with respect to 700-nm light, up to 5% with respect to 1,100 nm wavelength and at least 70% with respect to 500 nm wavelength upon formed into a double-plane glass plate of 1.6 mm to 0.1 mm in thickness.

(2) The infrared absorbing silica glass according to (1), which has an absorptivity of at least 60% with respect to 380 nm wavelength.

(3) The infrared absorbing silica glass according to (1) or (2), which has a degree of abrasion of up to 200.

(4) The infrared absorbing silica glass according to any one of (1) to (3), which has a coefficient of thermal expansion of up to $9 \times 10^{6+}$.

(5) The infrared absorbing silica glass according to (1), which comprises 70 to 98 mol % of $SiO_2$, 1 to 12 mol % of CuO and 1 to 18 mol % of a network modifier oxide other than CuO.

(6) The infrared absorbing silica glass according to (5), which comprises 78 to 94 mol % of $SiO_2$, 3 to 8% of CuO and 3 to 14 mol % of a network modifier oxide other than CuO.

(7) The infrared absorbing silica glass according to (5) or (6), wherein the molar ratio of the network modifier oxide with respect to CuO is at least 1.0 on an oxide basis.

(8) The infrared absorbing silica glass according to any one of (5) to (7), wherein the network modifier oxide comprises an oxide of any metal of Li, Na, K, Rb, and Cs.

In the process for making glass by the sol-gel method, a copper compound is introduced in the glass skeleton to allow a divalent copper oxide to be present in a stable manner. It is thus possible to obtain an infrared absorbing glass which has excellent infrared absorption capability and, at the same time, high visible light transmittance, chemical resistance and processability.

What we claim is:

1. A process of fabricating an infrared absorbing glass by introducing into a wet gel a divalent copper compound and a compound of a metal species for a network modifier oxide, and then dipping the wet gel in a dipping solution for precipitation in the wet gel of the civalent copper compound and the compound of a metal species for a network modifier oxide, followed by firing, and drying.

2. An infrared absorbing glass consisting of 70 to 98 mol % of $SiO_2$, 1 to 12 mol % of CuO, and 1 to 18 mol % of a network modifier oxide other than CuO, wherein said network modifier oxide is an oxide of at least one metal selected from the group consisting of Li, Na, K, Rb and Cs.

3. The infrared absorbing glass according to claim 2, which comprises 78 to 94 mol % of $SiO_2$, 3 to 8 mol % of CuO, network modifier oxide other than CuO.

4. The infrared absorbing glass according to claim 2 or 3, wherein the molar ratio of said network modifier oxide with respect to CuO is at least 1.0.

5. The infrared absorbing glass according to claim 2 or 3, wherein the molar ration of said network modifier oxide with respect to CuO ranges from 1.3 to 3.0.

* * * * *

UNITED STATES PATENT AND TRADEMARK OFFICE
CERTIFICATE OF CORRECTION

PATENT NO. : 6,342,460 B1
DATED : January 29, 2002
INVENTOR(S) : Akimoto et al.

It is certified that error appears in the above-identified patent and that said Letters Patent is hereby corrected as shown below:

Column 14,
Line 22, change "civalent" to -- divalent --; and
Line 37, change "ration" to -- ratio --.

Signed and Sealed this

Twenty-first Day of May, 2002

Attest:

Attesting Officer

JAMES E. ROGAN
Director of the United States Patent and Trademark Office